Patented Feb. 18, 1947

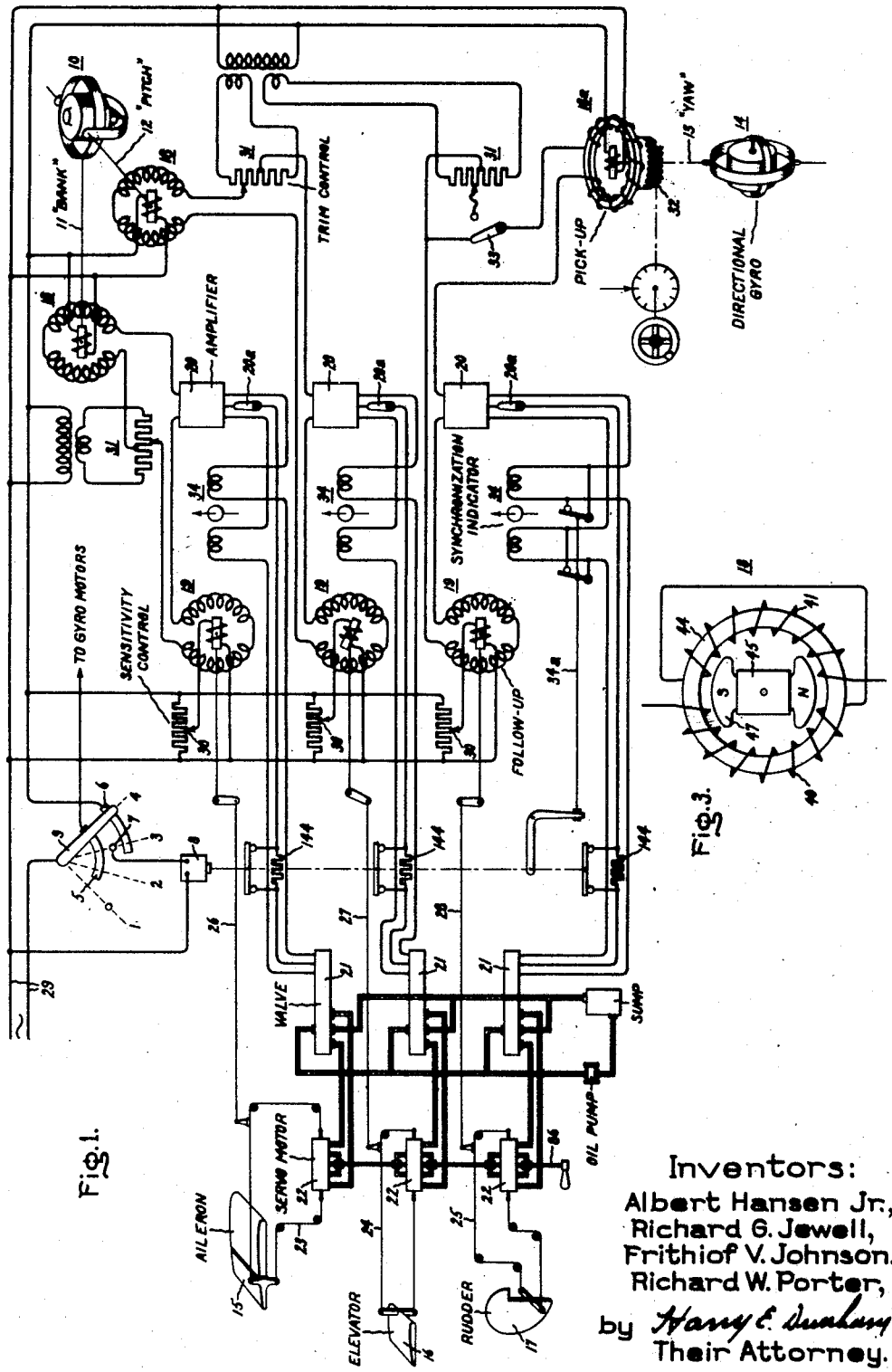

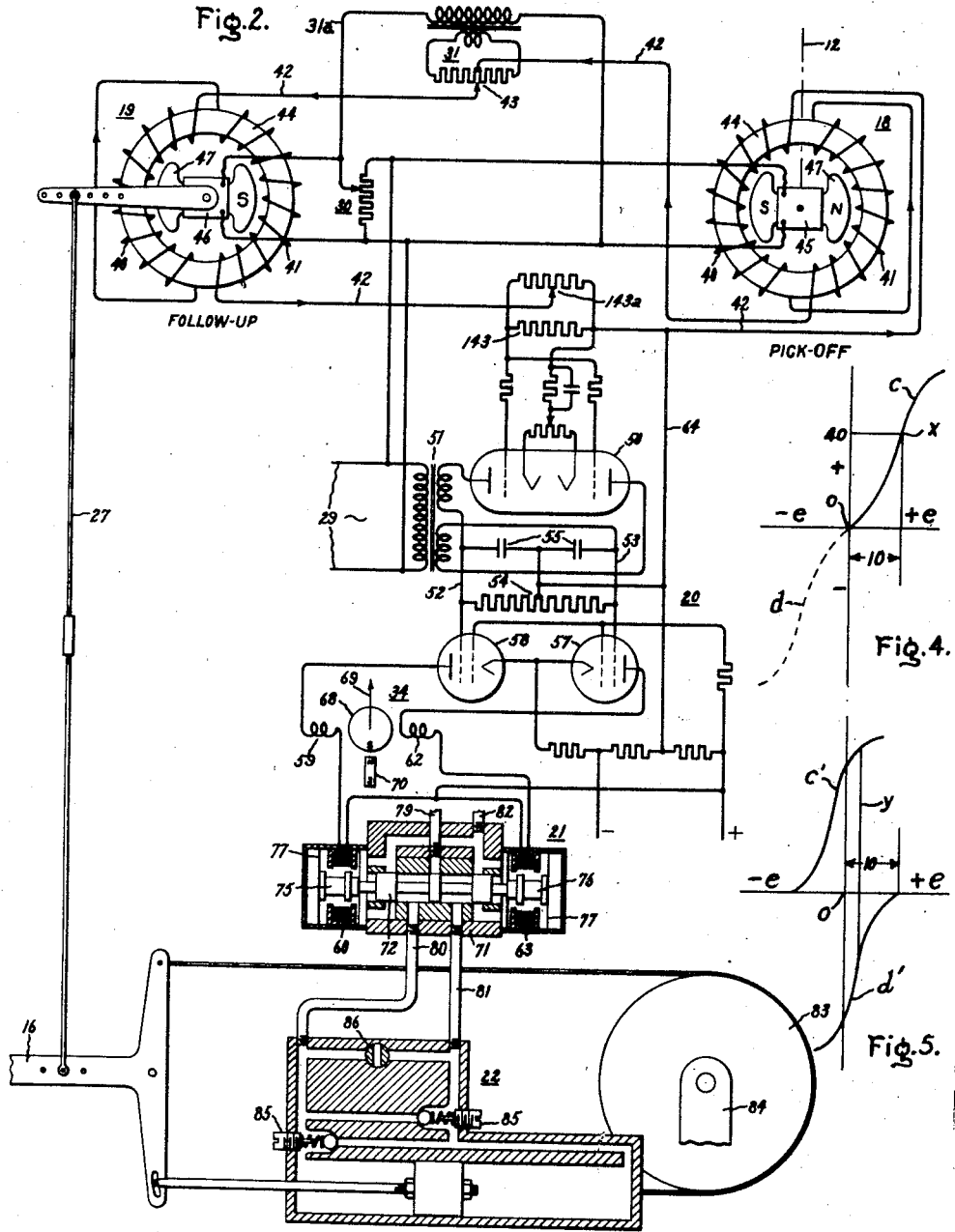

2,416,097

UNITED STATES PATENT OFFICE 2,416,097

AUTOMATIC PILOT

Albert Hansen, Jr., Nahant, and Richard G. Jewell, Swampscott, Mass., and Frithiof V. Johnson, Scotia, and Richard W. Porter, Schenectady, N. Y., assignors to General Electric Company, a corporation of New York Application May 28, 1943, Serial No. 488,914

14 Claims. (Cl. 244—77)

1

Our invention relates to automatic control equipment, particularly to automatic pilot control equipment for craft such as aircraft, and its object is to provide such equipment meeting the high sensitivity, ease of adjustment and installation and small space and weight requirements of modern high altitude aircraft.

In carrying our invention into effect, we provide sensitive electrical signaling devices which may be operated directly by gyroscopic instruments in a control system having electrical follow-up devices operated by movement of the ship's guiding surfaces which, when the control has responded, nullifies the signal and stops the controlling action. The system is adapted for all electrical control or for use with hydraulically operated steering apparatus having electrically operated valves energized through amplifiers. Provision is made for adjusting the sensitivity of control, the introduction of course-setting changes, changes from automatic to manual control, and vice versa, etc. Various other navigation and stability control features may be readily included due to the simplicity and flexibility of the system.

The features of our invention which are believed to be novel and patentable will be pointed out in the claims appended hereto. For a better understanding of our invention reference is made in the following description to the accompanying drawings in which Fig. 1 represents the general arrangement of our invention as applied for the automatic control of the ailerons, elevator and rudder of an airplane, Fig. 2 represents more in detail one complete control and follow-up system of which three are represented in Fig. 1, Fig. 3 shows a single phase inductive device in a maximum voltage regulating position. Several of these are used in a complete system such as is shown in Fig. 1. In Fig. 1 alternative single phase electrical and mechanical means are represented for introducing course-setting corrections into the system. Figs. 4 and 5 are curves explanatory of a desired amplifier adjustment to obtain desired oil valve operation response of which Fig. 6 is explanatory.

In Fig. 1, 10 is a diagrammatic representation of a gyroscopic instrument known as an artificial horizon. It may also be called a flight indicator or a bank and climb indicator and which in addition to giving visual indications, is used for control purposes. The gyroscope of such a device has a gyroscope rotor which spins on an approximately vertical axis and which is pivoted in a gimbal system on normally horizontal axes at right angles to each other. Its purpose is to indicate the pitch and bank of the plane on

2 which it is mounted. By means of such a device the turning of the plane about a lateral axis called "pitch" may be caused to turn a shaft 12 and the turning of the plane about its fore and aft axis may be caused to turn a shaft 11, the turning of such shafts corresponding respectively to the directions and magnitudes of pitch and bank. The structure of the device 10 by means of which this is accomplished is well-known and is not a part of the present invention and the illustration of the device 10 is diagrammatic. The direction and extent of turning of the airplane about its normally vertical axis called "yaw" is measured by a directional gyro diagrammatically illustrated at 14 and is caused to turn a shaft 13 accordingly. Thus, we have basic position maintaining instruments for measuring the direction and extent of turning of the airplane about these three axes at right angles to each other.

Between the shaft 11 and the ailerons of the plane one of which is represented at 15, is an electrical and hydraulic system for automatically controlling the position of the ailerons in accordance with the bank as measured by shaft 11. A substantially similar system is connected between shaft 12 and the ship's elevator 16 for automatically controlling the pitch angle of the plane and a substantially similar system is connected between shaft 13 and the ship's rudder 17 for automatically controlling the yaw direction of the airplane.

Each control system includes a signal generator comprising a single phase inductive voltage pick-off device 18 or 18a having a wound stator and rotor, the latter being turned by the shaft 11, 12 or 13. The stator windings of such pick-off devices are connected in series opposition to similar or substantially similar single phase inductive follow-up device 19 and the differential voltages, which are the algebraic sums of the pick-off and follow-up voltages, are amplified by rectifier amplifier devices 20 having output leads connected to solenoid operated oil valves 21, which in turn control hydraulic servomotors 22 connected by cables 23, 24 and 25 or otherwise to operate the ailerons, elevator and rudder respectively. The rotors of the follow-up devices 19 are mechanically connected to the corresponding control surface so as to be positioned thereby. Thus the rotor of follow-up 19 of the upper or bank control system is connected to the aileron cable 23 by a connection 26 such that when the ailerons are changed a corresponding rotary change is made in the position of the rotor of the follow-up 19 of that system. 27 and 28 indicate the mechanical connections between the control surfaces and electrical follow-ups of the pitch and yaw systems. The purpose of these follow-ups is to stop the controlling action when the desired controlling function has been completed and to prevent hunting of the controls. The rotor elements of all of the pick-off and follow-up devices are energized from a common single phase source of voltage 29 and means 30 are provided for varying the excitation voltages applied to the follow-up rotors for the purpose of controlling the sensitivity of the follow-up response. Means 31 are provided for introducing into each electrical system a small adjustable differential voltage for the purpose of changing the angular relation between the rotors of the pick-off and follow-up devices for the purpose of trim or course setting changes, and the devices 31 may therefore be termed trim control devices or course setters. Instead of electrically introducing such trim control or course setting voltage, we may accomplish the same result by mechanically rotating one of the stator elements and at 32 we have shown a worm gear device by means of which the stator of the pick-off 18a may be rotated for course setting purposes. In this case the device 31 of this system need not be used and is shown cut out by a switch 33.

Due to the nature of the gyroscope instrument 10, it will not be feasible to so rotate the stator elements of the pick-off devices associated therewith and hence an electrical type of course setter is to be preferred in the systems controlled therefrom. Also, for trim control purposes relatively small angular adjustments only of the ailerons and elevator surfaces will be required. Hence, the electrical means 31 shown will ordinarily be preferred in the pitch and bank systems.

In the output circuits of each of the amplifier rectifiers there may be inserted a direct current ratio type electrical measuring instrument 34 having a zero center scale. These devices are called synchronism indicators. They serve when connected in the circuit to indicate the position of the oil valve both before and after the oil is turned on and the degree of synchronism or correspondence between the desired position of the controlled surface such as the rudder 17 and the rotary position of the corresponding pick-off transmitter 18a as modified by any course setting adjustment. When the rudder is in the position called for by the pick-off device 18a, corresponding instrument 34 reads zero at the center of the scale. If the rudder is not in the correct position called for, the instrument shows by a right or left reading the direction and extent of the discrepancy. Hence during a controlling action the instrument, when in use, shows the direction and magnitude of such controlling action and returns to a zero reading when the controlling action has been fully completed.

Our invention concerns primarily the electrical portion of the automatic pilot system which has been outlined in connection with Fig. 1 and its adjustment and this portion will now be described in more detail.

In Fig. 2 we have represented one of the electrical systems of Fig. 1 assumed to be the pitch control system for the elevator 16. The stator element of the pick-off 18 and follow-up 19 may be and are here shown to be similar. Each has two windings 40 and 41 which are wound reversely on opposite halves of the ring magnetic cores 44 and connected in series and these windings on the two devices are also connected in series through the circuit 42 which includes a resistance 43 across which the amplifier input is connected and a variable resistance 43 constituting a part of the course setter 31. The course setter comprises a step-down transformer for producing a few volts across the resistance 43 so that any voltage from zero to a few volts may be introduced into the circuit 42 in either phase direction by moving the adjustable tap along 43. As represented, the top is at the zero center of the resistor 43 so that no voltage is being introduced.

The rotors of the devices 18 and 19 are or may be similar but their exciting windings 45 and 46 are reversely wound or connected so that as positioned, the bipolar rotor magnets 47 are reversely magnetized at any given instant as indicated by the N and S polarity marks thereon. The rotors of these devices are shown in what may be termed a null position in that the rotor flux induces zero voltages into the stator windings. Thus the voltage induced in the upper half of winding 40 is equal and opposite to that induced in the lower half of the same winding. The same is true with respect to winding 41 and hence there is no voltage produced by either device and the voltage across amplifier input resistance 143 is zero. The position of rotor winding 45 is determined by the pitch of the airplane assumed in Fig. 2 to be zero. However, if the airplane has its nose depressed for example, it may be assumed that rotor 45 will be turned clockwise by a corresponding amount. When either rotor 45 or 46 is turned from the zero voltage position, the voltages induced in their windings no longer add up to zero. Fig. 3 shows one of the maximum induced voltage positions for the device 18, where the rotor has been turned clockwise by 90 degrees. Here the voltages induced in windings 40 and 41 add up in series and are a maximum. For intermediate positions of the rotor between those discussed, the resultant voltage induced in the stator windings will be of an intermediate value proportional to the sine of the angle of deflection from the zero voltage position. A corresponding action will occur in the follow-up device 19 with rotor deflection in the same direction except that its stator voltage will be reversed to that produced by device 18 in the circuit 42. The rotor position of the follow-up is determined by the position of the controlled surface, in this case the elevator 16. It is now seen that the position of the rotors shown in Fig. 2 is a zero regulating position and that when the rotor of the pick-off device is rotated clockwise a few degrees, it first sends a current through circuit 42, say in the phase direction indication by the arrows thereon, producing a voltage across the amplifier input resistor 143. This causes one half of the differential amplifier rectifier 20 to function to energize the solenoid operated valve 21 and the servomotor 22 in such manner as to move the elevator 16 and connection 27 up, turning the rotor of the follow-up device 19 clockwise until its induced voltage equals and is opposite to that of device 18, at which time the control ceases and the rotor 46 and elevator 16 stop and remain in their new positions until a further regulation is called for. If, now, the pick-off rotor is moved counter-clockwise in response to the turning of the ship, the voltage induced in its stator will be reduced below that of device 19. Current will flow in circuit 42 in the opposite phase direction, causing the other half of the differential amplifier to function and energizing the solenoid valve 21 and servomotor 22 to operate the elevator and connection 27 downward until the voltage across the resistor 143 is reduced to zero and the regulation ceases. In case the rotor of device 18 rotates counter-clockwise beyond the zero voltage position, its stator voltage will reverse by 180 degrees phase position and increase in value in this new phase direction up to 90 degrees rotor deflection. The phase direction or polarity of the voltage of device 19 also reverses when its rotor is rotated counter-clockwise through the zero voltage position. Hence the regulation is the same either side of such 0-voltage rotor position and can occur over a range of nearly 180 degrees rotation of the inductive voltage regulating control and follow-up devices which is more than ample for the requirements. The transmission ratio of the follow-up connection 27 may be made adjustable as indicated.

Now, let us suppose that the airplane which is thus controlled is so loaded that it requires a different setting of the elevator in order to fly level automatically. This requires a course setting adjustment, or more correctly a trim control adjustment, where a part of the control voltage in circuit 42 is introduced from the device 31. For instance, the voltage which was introduced by a rotation of rotor 45 a few degrees clockwise may instead be introduced by movement of the tap 43 along its resistance in the proper direction and by the desired amount. The control will function just as before until follow-up device 19 turns to neutralize the control voltage after which automatic control device 18 will maintain this new course setting adjustment of the elevator automatically. In this case when regulation ceases the voltage of the follow-up 19 equals and opposes the algebraic sum of the voltages introduced by the course setter 31 and that produced by pick-off 18. The rotor positions of devices 18 and 19 now will not be the same for zero control voltage across resistance 143. In Fig. 1 the relative rotor positions of pick-off 18 and follow-up 19 of the pitch control system are different, indicating that a voltage has been introduced at the course setter 31 of that system. The course setter may be provided with a scale to indicate the direction and extent of the course setting adjustment.

A course setting adjustment will ordinarily so turn the ship that the pick-off device is turned with respect to its gyro, in which case when the ship has responded to the control the follow-up will have returned to a zero voltage position and the course setting adjustment voltage will then be equal and be opposite to that of the pick-off.

If the trim control or course setting adjustment is to compensate for some condition such as a heavy tail load or a cross wind which would otherwise cause the plane to depart from straight level flight, the corresponding follow-up voltage will be opposed to the course setting voltage and the pick-off will come back to a zero voltage position.

The degree of sensitivity of the control may be varied by the sensitivity control device 30 by means of which the excitation voltage relation on the rotor windings 45 and 46 may be varied. Changes in sensitivity are desirable to adapt the control for different flying conditions, aeroplane speeds, different altitudes, changes in weather conditions, etc. The voltage control device 30 may be a variable resistance or a variable autotransformer. The voltage induced in the stator winding of devices 18 and 19 for any given angular position other than the zero voltage position depends upon the rotor primary excitation. These devices 18 and 19 are voltage transformers and are essentially Selsyn devices provided with means for varying the rotor excitation by means of which the voltage gradient of the output may be changed. Hence the secondary stator voltage varies with the primary voltage as well as with the rotor position. If, then, we lower only the voltage of device 19 by adjustment of the sensitivity control, its rotor will be required to rotate further from the zero voltage position than the rotor of device 18 in order to produce the same secondary voltage. Hence, with such adjustment the sensitivity is increased or there is a greater movement of the elevator for a given change in position of the rotor of the pick-off device 18 than before. The increased sensitivity also applies with respect to a given course setting adjustment.

If, on the other hand, we increase the secondary voltage of device 19 as compared to device 18 for a given angular setting, the sensitivity of the control is decreased, and it will require less movement of the elevator and rotor of device 19 to balance a given angular rotation of the rotor of the pick-off 18. It will be noted that the sensitivity control has no effect when the rotors are in their zero voltage positions whereas the course setting control does. Such sensitivity control is adjustable over a wide range from unstable hunting to a stable overdamped operation of the control.

In place of or in addition to the sensitivity control just described, we may provide a potentiometer 143a (Fig. 2) across the amplifier input either shunted across the input resistance 143 or in series with it. Adjusting the tap on this potentiometer will in effect vary the amount of signal input to the amplifier, hence the amount the control signals are amplified causing the control to become more or less sluggish, depending upon the adjustment.

It will be noted that in Fig. 1 the trim control 31 and the sensitivity control 30 are both connected across the single phase source 29 and are independently adjustable and the adjustment of sensitivity control does not influence the voltage which may be introduced into the series control circuit 42 by the trim control. In Fig. 2 we have shown a slightly modified relation between these control devices which is a refinement that may be desirable particularly on large passenger planes. In Fig. 2 the transformer primary of trim control 31 instead of being directly connected across source 29 is connected across source 29 through wire 31a and that part of the resistance of sensitivity control 30 which is used in reducing the excitation of rotor coil 46. Hence as the sensitivity is increased by reducing the voltage of follow-up 19 in relation to that of pick-off 18 the trim control voltage is reduced accordingly although both are otherwise independently adjustable. The reason for such refinement may be illustrated by the following example, given with respect to rudder control. Assume the aeroplane is flying at a given altitude, direction and speed and that by reason of a cross wind has its rudder positioned off-center sufficiently to counteract the action of the cross wind in maintaining the given course. This is accomplished to introduce a voltage in the circuit 42 in the proper direction by the trim control 31. Now, assume that for some reason it becomes desirable to increase the sensitivity. An increase in sensitivity will of itself increase the off-center position of the rudder under the conditions assumed.

It is seen that in Fig. 2 when the sensitivity is increased, the voltage input to the trim control device 31 is reduced in proportion and vice versa. Hence, by reason of this refinement in Fig. 2 a change in sensitivity also changes the trim control voltage which is being used by an amount and in a direction to maintain the desired course or other attitude of the plane without requiring any other adjustment. Disturbance to the passengers or shifting of the load by reason of a sudden change in course which might otherwise occur in changing the sensitivity is thus avoided.

The sensitivity control may be applied to either device 19 or 18 and any scheme for varying the relative secondary voltage relation of these devices for a given angular position of their rotors may be used in place of the particular sensitivity control described for that purpose.

The devices 18 and 19 are small, low voltage devices with smooth stator cores and hence have no locking torque tendency in any position. Rotation of the rotor of pick-off device 18 therefore imposes no restraining error on the gyroscope instrument. The voltages necessary to impress across the resistance 143 for control purposes are small and hence the induction regulator pick-off and follow-up devices can be made small and compact and use small connecting wires insulated for low voltages. The follow-up device 19 may be located close to the control surface such as the elevator 16 while the pick-off device 18 may be built on or as a part of the structure of the gyroscope instrument assembly. The sensitivity and course setting control devices may be located where most convenient, since the small size, low voltage wiring can be run anywhere and imposes no restrictions on the locations of the different electrical elements of the system.

Various differential amplifier rectifier arrangements responsive to the phase reversal and magnitude of the input control voltage may be used. The amplifier rectifier arrangement illustrated has two stages. The first stage comprises the envelope 50 containing two three-element amplifier units with their cathodes and control grids connected in the same direction across the resistance 143. These first stage amplifier units have their output circuits 52 and 53 supplied in opposite phase relation from the A.-C. source 29 through a transformer 51. Source 29 for transformer 51 is the same source which energizes the pick-up follow-up electrical system and hence the voltage across the resistance 143 supplying the biasing grids of the amplifiers of tube 50 has an opposite phase relation with respect to the supply voltage of the two plate circuits at any instant.

Hence, more current will flow in plate circuit 53 than in 52 when the voltage across resistance 143 is in one phase direction, and more current will flow in plate circuit 52 than in 53 when the phase direction of the voltage across resistance 143 reverses by 180 degrees. Parallel connected resistances 54 and condensers 55 are connected across the plate circuits and these plate circuits are completed to the cathodes of tube 50 through the wire 64 which connects to the mid point of the resistance 54 and condensers 55.

A second differential amplifier rectifier stage comprising tubes 57 and 58 is provided supplied from a direct current source as indicated. The plate circuit of tube 58 is connected through the coil 59 of the synchronizing indicator 34 and solenoid winding 60 of valve 21 while the plate of tube 57 is connected through coil 62 of the synchronizing indicator and solenoid coil 63 of the valve 21.

The attitude synchronizer indicator 34 is in reality a differential current indicator which measures the difference in current flowing in the coils 60 and 63. It has an armature 68 polarized across a vertical diameter when in the zero center position shown. When the current in coil 59 predominates, the instrument pointer 69 deflects to the left and when the current in coil 62 predominates, the instrument deflects to the right. A small stationary permanent magnet 70 provides a zero centering return torque. When a controlling action is occurring, the indicator 34 will indicate that fact and also the direction and general magnitude of the controlling action. After the controlling action has been completed, this indicator should return to a zero center deflecion. If it does not do so, it indicates that there has not been a complete response and that the follow-up 19 has not rotated to a position to reduce the voltage across resistance 143 to zero.

The primary function of the attitude synchronizer is to indicate when the automatic pilot system is properly adjusted to automatically hold the flight altitude desired when changing from manual to automatic control. For example, suppose a human pilot is flying a given course and desires to hold such course automatically. He adjusts the several controls 31 until the instruments 34 of the corresponding systems read zero or center and then changes to automatic control by closing valve 86. This instrument 34 will also indicate any overshooting or hunting of the automatic control. This instrument thus shows how the system is functioning and indicates the degree of synchronism between the control surface such as the elevator and what is called for by the gyroscope and course setting devices.

The solenoid operated oil valve 21 for the hydraulic system comprises a suitable oil tight cylinder 71 containing a slidable valve member 72 which may be moved axially to cover and uncover the necessary valve ports for controlling the flow of fluid to and from the hydraulic piston servomotors 22 which operate the elevator 16. Secured to either end of the valve member 72 are spool shaped magnetic cores 75 and 76 forming the cores of the solenoids having the energizing coils 60 and 63. The valve member 72 and its attached core parts are normally centered in a neutral position by skeleton diaphragm springs 77. The construction of the operating solenoids for the oil valve 21 forms the subject matter of a copending application of E. R. Boynton and W. T. Rauch, Serial No. 556,535, filed Setember 30, 1944, which is assigned to the same assignee as the present invention. When coil 60 is energized, the valve 72 is moved to the right to connect supply port 79 with port 80, thereby allowing oil under pressure to flow to and operate piston motor 22 to the right and turning the elevator 16 down. At the same time port 81 is connected to the exhaust port 82 to permit oil or other operating fluid to flow from the exhaust side of piston motor 22 to a sump tank. When coil 60 is deenergized the valve 72 is returned to the central neutral position by the diaphragm springs 77. The opposite operation occurs when coil 63 is energized or predominantly energized, causing the elevator 16 to be operated in the opposite direction.

The automatic pilot operating forces for the various control surfaces are such as to be sufficient for operating purposes but not so great as to prevent these forces from being overcome by manual control of the control surfaces in emergency conditions. In Fig. 2 the pulley 83 and stick 84 may represent the usual manual control for the elevator 16 and 85 represents pressure relief valves between the fluid supply connections 80 and 81 to the fluid piston motor 22. Under normal conditions of automatic control relief valves 85 remain closed but will open under increased pressure to by-pass the oil between the oil motor piston ends if the elevator is forcibly moved by manual control. The automatic pilot control may, of course, be cut out for landings and take-off and the like by opening a switch 9 to the source of voltage supply 29, see Fig. 1. Also, a by-pass valve 86 may be opened between the fluid supply pipes 80 and 81 (see Fig. 2) to relieve any resistance to manual control by the piston motor 22. During manual control the electrical system may be left energized and valve 86 opened in which case the synchronizing indicators 34 will function to show the pilot the positions of his control surfaces relative to basic gyroscope positions. Any one or two of the three systems may be on automatic control while the remaining system or systems have manual control.

It will be evident that changing the position of a stator element as provided for by the mechanism 32 at pick-up device 18a, Fig. 1, will have the same effect on course setting as introducing a voltage by the device 31. The mechanical arrangement of rotating the stator for this purpose has an unlimited range, that is the stator may be rotated 360 degrees, if desired, whereas electrical course setting by the devices 31 is for practicable purposes limited to less than 90 degrees, which is generally sufficient. If the stator 18a be rotated continuously at a given rate the plane will make a constant turn at a corresponding rate. The same result may be obtained by caging the directional gyro 14 and changing the course setter by a definite angle.

The stator of the follow-up 19 may, of course, be rotated mechanically to accomplish this course setting, but generally it will not be conveniently located for that purpose. The valve 21 is a proportionate type of valve. That is, the extent of opening is proportional to the difference in the currents in the two coils 60 and 63 or if only one coil is energized at a time then the valve opening is proportional to such energizing current. A proportionate valve is desirable to prevent overshooting, hunting and jerky control characteristics because it is evident that if the valve was of the on-off type where it moved from full closed to fully open position at a given value of current differential and vice versa the control would overshoot and be jerky. On the other hand, if the valve opening is proportional to the differential control voltage across resistance 143 over the complete range of control, the control would be too sluggish and slow. The characteristics desired are those of a proportionate valve opening and closing action for the smaller values of the control voltage across resistance 143 and the characteristics of an on-off valve for the larger values of control voltage across resistance 143. These desirable characteristics are obtained by using the differential amplifier in combination with the proportionate valve with the control voltage amplifier characteristics and differential valve operating current adjusted and correlated as now to be described.

Let us assume that the range of control voltage across resistance 143 which we will designate $e$ is from 1 to 10 volts, that the differential current of coils 60 and 64 sufficient to fully open the valve is 40 milli-amperes and that over the control voltage range $e$ up to 3 volts we desire a proportional operation of the valve and that from 3 to 10 volts $e$ we desire the valve to be fully opened.

In general the characteristic saturation curve of a vacuum tube amplifier is represented by the full line curve $c$, Fig. 4, where the ordinates represent plate current and the abscissa grid voltage. If we adjust conditions so that the plate currents of tubes 57 and 58 are zero when the voltage $e$ is zero and so that tube 57 passes current when $e$ rises in one phase direction and tube 58 passes current when $e$ rises in the opposite phase direction, the full line curve $c$ (Fig. 4) may represent the characteristic current output curve of tube 57 and the dotted line curve $d$ the corresponding curve of tube 58. The plate currents, while both of the same polarity, are plotted above and below the zero current line because of their opposing actions on the oil valve. If point $x$ on curve $c$ corresponds to 40 milliamperes output current of tube 57 with a value of $+10e$, curve $c$ from $o$ to $x$ will represent the proportionate energizing current, valve opening characteristics of the valve in the corresponding direction of operation. It is seen that the valve will be only about one-fourth open at 5 volts $e$. The valve operation and resultant regulation will be slow. To obtain the characteristics desired the amplifier is adjusted relative to $e$ and $x$ so as to obtain operating conditions corresponding to those shown in Fig. 5 where $c'$ and $d'$ are the operating curves of tubes 57 and 58. When voltage $e$ is zero the grids of the two tubes are given a positive bias so that they pass equal currents of appreciable magnitude. A rise in voltage $e$ in one direction will cause the output current of one tube to decrease and that of the other tube to increase and the valve opening is proportional to their difference until it is fully opened, which will occur at about 3 volts $e$. Thus in Fig. 5 the line $y$ represents the output currents of the tubes at +3 volts bias, that part above the zero line being the current of tube 57 and that part below the zero line the output of tube 58. Excessive current in the plate circuits of tubes 57 and 58 is avoided by reason of the saturation of the tubes within the range of variation of voltage $e$. We obtain the advantages of both the proportionate and on-off types of valve operations with none of their disadvantages. That is, we obtain the proportionate non-hunting characteristics of the proportionate valve when small regulating requirements are called for and at the beginning and end of all regulating operations and the quick operating characteristics of the on-off type of valve when large regulating requirements are called for. The comparative difference in the operating voltage-valve movement action under the two different conditions may be represented as in Fig. 6, where valve opening is plotted in the vertical axis against the regulating voltage $e$ on the horizontal axis for one direction of operation of the valve. Curve $f$ corresponds to the condition of Fig. 4 and curve $g$ to the condition of Fig. 5. The flat top of curve $g$ represents full valve opening. A third curve $h$, shown dotted, may be added to represent the kind of operation that would be obtained with an on-off type of valve. It will be evident that the proportionate regulating part of curve *g*, that is the sloping part, may be increased or decreased by suitable adjustments of the amplifier.

The various features of the control system properly coordinated result in a superior automatic pilot control of the follow-up differential proportionate type which is nevertheless fast in operation. This has been demonstrated by successful flight tests. The single phase pick-off device produces a voltage indicative of the position of the aeroplane relative to a basic position maintaining member. The single phase follow-up device produces a voltage indicative of the position of the control surface relative to the aeroplane. The difference of these voltages for a given sensitivity adjustment is indicative of the positions of the control surface and basic position maintaining member relative to each other and such difference together with any trim of course setting voltage that may be introduced constitutes the control voltage. This control voltage reverses in phase direction according to the direction of regulation desired and varies in magnitude in proportion to the extent of regulation desired. This control voltage is amplified and converted to differential direct currents for operating the solenoid oil valve. The differential amplifier is adjusted to saturate within the regulating voltage range with such differential current valve as to obtain both proportionate opening and on-off valve operating characteristics with the proportionate type of valve used, whereby fast but non-hunting regulation is obtained. Such desirable regulating characteristics may be maintained under various different operating conditions such as changes in aeroplane speed, changes in altitude, etc., by changing the sensitivity.

In changing from automatic to manual control and vice versa, the procedure may be varied to suit the requirements of the situation and desires of the flight personnel, and we do not propose to limit our invention in this respect. The gyro instruments preferably should be available for either purpose, that is, when using manual control the gyros should be in operation so as to be used as indicating flight instruments. It is unnecessary for the automatic pilot control systems to be energized at such times, although they may be, and the valves 86 left open so that there is no automatic control operation. In going from manual to automatic control quickly, it may be desirable to automatically include a "soft" automatic pilot control step to prevent any sudden and substantial change in the position of the control surfaces. Such step is here referred to as "soft" to indicate that there is automatic control but that such control is of reduced force, and is such as to bring the control surfaces toward synchronism with the control gyroscopes gradually. After synchronism has been established approximately, full power automatic control may be applied and the latter will be referred to as "hard" automatic pilot. For prolonged automatic control it may also be desirable to cut out the synchronizing instruments 34 to prevent wear in their bearings, and also to diminish distraction of the human pilot.

As an example of one procedure in going from manual to automatic control, we have shown in Fig. 1 several contact control features associated with the switch 9. It is noted that the switch has four positions marked 1, 2, 3, and 4. Position 1 is an "off" position where all electrical circuits of the automatic pilot system are deenergized. In position 2 a switch connects source 9 to a sector shaped contact 5 and wire having an arrow reading "To gyro motors." Thus in position 2 of switch 9 the gyroscopes 10 and 14 will be in operation and may be used as indicating instruments for manual pilot control. Such motors may be electrically driven but the symbol here referred to is intended to refer to the control of any form of power for driving the gyroscopes. In position 3 connection is made between switch arm 9 and the sector shaped contact 6, and the various electrical circuits of the automatic pilot control systems thus become energized. Contact is also made with a contact button 7 so that a relay 8 is energized and provides for the "soft" control. Relay 8 when thus energized places resistances 144 in the common return circuits of the solenoids which operate the various valves 21. This causes a reduced or lower than normal level of control current for the different valves 21. Hence, the valves will operate but at reduced operating current corresponding to the reduced operating current level, and the response of the control is reduced to a "soft" condition suitable for gradually establishing synchronism between control surfaces and basic control gyroscopes, should they be considerably out of synchronous relation. We may also provide connections 34a or the equivalent, only one of which is shown, between the relay mechanism 8 and the synchronizing indicators 34, which when the relay is energized, open short circuits for such indicators. Hence, in position 3 of switch 21 the automatic pilot control is "soft" and the synchronizing indicators 34 are in operating condition. The "soft" pilot connection position 3 needs to be maintained only long enough for the various synchronizing indicators to approach a central neutral position, indicating that substantial synchronism of the various controls has been reached. Then the switch 21 is moved to the fourth position or "hard" automatic pilot position. In position 4 relay 8 is deenergized and the resistances 9 are short circuited, also the synchronizing indicators are short circuited and full or "hard" automatic control is obtained. The sectors 5 and 6 of switch 21 are of course contacted in positions 3 and 4. While in position 4, full manual control may be had by opening valves 86, and manual control of one or two systems may be had with automatic control of the remaining systems or system by only opening a portion of such valves selected at will, or by opening one or more of the control circuits as at 20a (Fig. 1). The switch arrangement at 21 is only one of a variety of arrangements that may be used, as the apparatus is adapted for wide flexibility, but it will generally be desirable to provide for a "soft" automatic control step in going from manual to automatic control. Under certain flying conditions and for instruction purposes, it may be desirable to employ manual control when the automatic systems are energized for "soft" automatic control.

In accordance with the provisions of the patent statutes, we have described the principle of operation of our invention together with the apparatus which we now consider to represent the best embodiment thereof, but we desire to have it understood that the apparatus shown is only illustrative and that the invention may be carried out by other means.

What we claim as new and desire to secure by Letters Patent of the United States is:

1. In an automatic control device for a craft, the combination with a position-maintaining means for detecting movement of said craft about a control axis thereof, a control surface for controlling the attitude of the craft about said control axis, and a hydraulic servomotor connected to move said control surface, of single phase inductive pick-off and follow-up devices operated in response to movement of said position-maintaining means and control surface respectively, said devices producing secondary voltages of the same frequency which voltages are indicative of the positions of said position-maintaining means and control surface with respect to said craft, the secondaries of said devices being connected in a series circuit in opposition so as to produce a voltage difference indicative of the position of said position-maintaining means and control surface wth respect to each other, means for introducing into said series circuit an adjustable voltage substantially in phase with either of the secondary voltages of said inductive devices, a phase responsive differential amplifier controlled by the resultant differential voltage in said series circuit and having two direct current output circuits, a pair of solenoids differentially energized by the current in said output circuits, a normally closed two-way valve operated by said solenoids for controlling said servomotor, and means for controlling the sensitivity of the control by varying the secondary voltage magnitude relation of said pick-off and follow-up devices.

2. In an automatic control device for a craft, the combination with a position maintaining means for detecting movement of said craft about a control axis thereof, a control surface for controlling the attitude of said craft about said control axis, and a servomotor connected to move said control surface, of an inductive pick-off device operated in response to movement of said position-maintaining means, an inductive follow-up device operating in response to movement of said control surface, said pick-off and follow-up devices having primary windings energized from a common source of alternating current and secondary windings connected in series circuit opposition, a differential amplifier controlled by the differential voltage in said series circuit and having an output which is sensitive to the magnitude and phase direction of said differential voltage, an electrically operated controller differentially energized from the output of said amplifier for controlling said servomotor and determining the direction of movement thereof in accordance with the phase direction of the differential voltage input to said amplifier and means for varying the secondary voltage magnitude relation of said pick-off and follow-up devices to control the sensitivity of the system.

3. In an automatic control device for a craft, the combination with a position-maintaining means for detecting movement of said craft about a control axis thereof, a control surface for controlling the attitude of said craft about said control axis, and a servomotor connected to move said control surface, of a single phase inductive device operated in response to movement of said position-maintaining means relative to said craft, a single phase inductive device operated in response to movement of said control surface relative to said craft, said two inductive devices having primary windings energized by a common single phase source of supply and the secondary windings connected in series opposition and each having a range of regulation over which their secondary voltages vary in magnitude and reverse in phase, a differential amplifier means having an input circuit energized by a differential voltage in said series secondary circuit of said inductive devices, said amplifier means having a pair of differential direct current output circuits the relative current magnitude of which varies inversely in response to the magnitude and phase direction of the input voltage to said amplifier means, an electrically operated controller differentially energized from the direct current output of said amplifier means for controlling said servomotor and determining the direction of operation thereof in accordance with the phase direction and magnitude of the input voltage to said amplifier, and means for varying the relation between the secondary voltages of said inductive devices to vary the sensitivity of the control.

4. In an automatic control device for a craft, the combination with a position-maintaining means for detecting movement of said craft about a control axis thereof, a control surface for controlling the attitude of said craft about said control axis, and a servomotor connected to move said control surface, of a single phase inductive pick-off operated in response to the direction and magnitude of changes in the position of said craft as measured by said position maintaining means, a single phase inductive follow-up device operated in response to the direction and magnitude of movement of said control surface relative to said craft, said pick-off and follow-up devices having a uniform reluctance in all regulating positions and each having a range of regulation over which their secondary voltages vary in magnitude and reverse in phase, means for energizing the primary windings of said pick-off and follow-up devices from a common single phase supply, circuit means for connecting the secondary windings of said pick-off and follow-up devices in series opposition, amplifier means controlled in response to the differential voltage in the series secondary circuit of said pick-off and follow-up devices, means responsive to the output of said amplifier means for controlling the operation of said servomotor such that when an amplifier controlling differential voltage occurs in said series secondary circuit the control surface is moved in such a direction and to such a position as to reduce said voltage to zero, and means for adjusting the relative magnitudes of the secondary voltages to said pick-off and follow-up devices to obtain a desired sensitivity of the control.

5. In an automatic control device for a craft, the combination with a position-maintaining means for determining movement of said craft about a control axis thereof, a control surface for controlling the attitude of said craft about said control axis, and a hydraulic servomotor connected to move said control surface, of single phase inductive devices having primary and secondary windings and having rotary elements connected to be moved by said position maintaining means and said control surface respectively, a common source of alternating current for energizing said primary windings, a circuit connecting said secondary windings in series opposition, phase sensitive differential amplifier means responsive to the differential voltage in the series secondary circuit of said inductive devices and having two direct current output circuits the relative current magnitudes of which are determined by the phase of the input voltage, a normally closed valve for controlling the flow of an operating fluid to said hydraulic servomotor, said valve having two operating solenoids connected respectively in the two direct current output circuit of said amplifier means, one solenoid for operating the valve in one direction for one direction of operation of said servomotor and the other solenoid for opening the valve in the opposite direction for opposite direction of operation of said servomotor, the extent of operation of said valve in either direction being proportional to the relative energization of said solenoids.

6. In an automatic control device for a craft, the combination with a position-maintaining means for detecting movement of said craft about a control axis thereof, a control surface for controlling the attitude of said craft about said control axis, and a hydraulic servomotor connected to move said control surface, of electrical pick-off and follow-up means respectively responsive to the movement of said position-maintaining means and control surface for producing single phase voltages of the same frequency, the magnitude and phase of such voltages being indicative of the position of said position-maintaining means and control surface relative to said craft and the difference of said voltages being indicative of the position of said position-maintaining means and control surface relative to each other, such difference voltage comprising a component of the control voltage, phase responsive differential amplifier means responsive to the control voltage having two direct current output circuits, the current in which is balanced for zero control voltage and becomes unbalanced in proportion to the magnitude of the control voltage and in a direction dependent upon the phase direction of the control voltage, a normally closed valve for controlling the flow of the operating fluid in said hydraulic servomotor, said valve having opening movements in opposite direction for opposite directions of movement of said control surface, and two solenoids energized respectively by the current in the two output circuits of said amplifier means for opening said valve in opposite directions, the opening of said valve in either direction being proportional to the amplifier current output unbalance, said amplifier means being adjusted to saturate at a relatively low value of control voltage and with a current unbalance sufficient to completely open the valve whereby quick and non-hunting control characteristics are obtained.

7. In an automatic pilot control device for a craft, the combination with a position-maintaining means for detecting movement of said craft about a control axis thereof, a control surface for controlling the attitude of said craft about said control axis, and a servomotor connected to move said control surface, of electrical pick-off and follow-up means respectively responsive to movement of said position-maintaining means and control surface for producing voltages indicative of the positions thereof relative to said craft, the difference between such voltages being indicative of the position of said position-maintaining means and control surface relative to each other, said difference comprising a component of a control voltage, a reversible electrically operating controller for controlling the operation of said servomotor, a differential amplifier responsive to the control voltage and having two output circuits differentially connected to and for energizing said controller, an unbalance of the output currents of the amplifier in opposite directions corresponding to reverse actuations of said controller and reverse operations of said servomotor and an electrical instrument responsive to the direction and extent of unbalance of the output currents of said amplifier for giving an indication as to the condition of synchronism between the actual position of said control surface and its position as called for by the automatic pilot control system.

8. In an automatic control device for a craft, the combination with a position-maintaining means for detecting movement of said craft about a control axis thereof, and a control surface for controlling the attitude of said craft about said control axis, of a control system between said position-maintaining means and said control surface for moving the latter in response to movements of said position-maintaining means relative to said craft such that said craft is normally maintained in a predetermined position relative to said axis, trim control means included in said control system for shifting the position of said control surface relative to the position of said control member, means included in said control system for changing the control sensitivity of said system, and compensating means for the trim control operated by said sensitivity control whereby a change in the position of said craft about said axis which would otherwise be caused by such change in sensitivity is nullified.

9. In an automatic control device for a craft, the combination with a position-maintaining means for detecting movement of said craft about a control axis thereof and a rudder for controlling the attitude of said craft about said control axis, of a control system between said position-maintaining means and said rudder for normally maintaining a predetermined flight attitude of said craft, a course setter included in said control system for selectively changing the relative positions of said position-maintaining means and said rudder, means included in said control system for changing the control sensitivity of said system for adjusting the control system for different craft speeds, altitudes, etc., and means operated by such sensitivity control for modifying the influence of the course setter such that changes in the control sensitivity of the system have a minimized effect on the attitude of said craft.

10. In an automatic control device for a craft, the combination with a position-maintaining means for detecting movement of said craft about a control axis thereof, a control surface controlling the attitude of said craft about said control axis and servomotor connected to said control surface, of a pick-off means actuated by movement of said position-maintaining means relative to said craft for producing alternating voltage the magnitude of which varies as a function of the deviation of said craft from a predetermined attitude and the phase of which relative to a reference voltage varies in accordance with the direction of said deviation, follow-up means actuated by movement of said control surface relative to said craft for producing an alternating voltage the magnitude of which varies as a function of deviation of said control surface from a neutral position and the phase of which relative to said reference voltage varies in accordance with the direction of movement of said control surface from said neutral position, means for comparing the voltages produced by said pick-off means and said follow-up means so as to produce a resultant control voltage the magnitude and phase of which is indicative of the positions of the control surface and position-maintaining means relative to each other, and means controlled by said resultant voltage for controlling said servomotor to actuate said control surface in a direction determined by the phase of said resultant voltage and at a speed variable as a function of the magnitude of said resultant voltage.

11. In an automatic control device for a craft, the combination with a position-maintaining means for detecting movement of said craft about a control axis thereof, a control surface for controlling the attitude of said craft about said control axis and a servomotor connected to move said control surface, of pick-off means for actuating by movement of said position-maintaining means relative to said craft for producing an alternating voltage the magnitude of which varies as a function of the deviation of said craft from a predetermined attitude and the phase of which relative to a reference voltage varies in accordance with the direction of said deviation, follow-up means actuated by movement of said control surface relative to said craft for producing an alernating voltage the magnitude of which varies as a function of deviation of said control surface from a neutral position and the phase of which relative to said reference voltage varies in accordance with the direction of movement of said control surface from said neutral position, means for producing a trim voltage, means for comparing said trim voltage and the voltages produced by said pick-off and follow-up means so as to produce a desired resultant control voltage the magnitude and phase of which are indicative of the positions of the control surface and position maintaining means relative to each other as modified by the said trim voltage, means comprising said servomotor controlled by said resultant voltage for actuating said control surface in a direction determined by the phase of said resultant voltage relative to said source and at a speed variable as a function of the magnitude of said resultant voltage and means for varying said trim voltage to effect a change in said predetermined attitude.

12. In an automatic control device for a craft, the combination with a position-maintaining means for detecting movement of said craft about a control axis thereof, a control surface controlling the attitude of said craft about said control axis, and a servomotor connected to move said control surface, of an inductive pick-off device having a control member coupled to said position-maintaining means, an inductive device having a control member coupled to said servomotor, each of said inductive pick-off and follow-up devices having a primary winding energized from a common source of alternating current and a secondary winding positioned relative to its primary winding by the control member associated therewith so that the voltage output thereof varies in polarity and magnitude in accordance with the direction and amount of displacement of the control member from a null position, and means for controlling the direction of movement of said servomotor in accordance with the polarity and magnitude of the algebraic sum of the voltage outputs of the secondary windings of said inductive pick-off and follow-up devices.

13. In an automatic pilot control device for a craft, the combination with a position-maintaining means for detecting movement of said craft about a control axis thereof, a control surface controlling the attitude of said craft about said control axis, and a servomotor connected to move said control surface, of an inductive pick-off device having a control member coupled to said position-maintaining means, an inductive follow-up device having a control member coupled to said servomotor, each of said inductive devices having a primary winding energized from a common source of alternating current and a secondary winding positioned relative to its primary winding by the control member associated therewith so that the voltage output thereof varies in polarity and magnitude in accordance with the direction and amount of displacement of the control member from a null position, means for controlling the direction of movement of said servomotor in accordance with the polarity and magnitude of the algebraic sum of the voltage outputs of the secondary windings of said inductive devices, and means for adjustably varying the excitation of the primary winding of one of said inductive devices for varying the control sensitivity.

14. In an automatic pilot control device for a craft, the combination with a position-maintaining means for detecting movement of said craft about a control axis thereof, a control surface controlling the attitude of said craft about said control axis, and a servomotor connected to move said control surface, of a pick-off signal generator, a follow-up signal generator, a trim signal generator, each of said signal generators having a movable control member and being arranged to produce an output signal voltage variable in polarity and magnitude in accordance with the direction and amount of movement of the control member from a null position, polarity sensitive means responsive to the algebraic sum of the voltage outputs of said signal generators for controlling the direction of movement of said servomotor, means responsive to the movement of said position-maintaining means relative to said craft for actuating the control member of said pick-off signal generator, means responsive to movement of said control surface for actuating said follow-up signal generator whereby said servomotor actuates said control surface to stabilize said craft about said control axis in a predetermined attitude and means for manually actuating the control member of said trim signal generator to change the stabilized attitude of said craft.

ALBERT HANSEN, JR.
RICHARD G. JEWELL.
FRITHIOF V. JOHNSON.
RICHARD W. PORTER.

REFERENCES CITED

The following references are of record in the file of this patent:

UNITED STATES PATENTS

| Number | Name | Date |
| --- | --- | --- |
| 1,998,938 | Mittag | Apr. 23, 1935 |
| 2,088,654 | Hull | Aug. 3, 1937 |
| 2,234,326 | Tiebel | Mar. 11, 1941 |
| 2,040,014 | Moseley | May 5, 1936 |
| 2,088,654 | Hull | Aug. 3, 1937 |
| 2,188,834 | Fischel et al. | Jan. 30, 1940 |
| 2,317,383 | Hull | Apr. 27, 1943 |
| 1,772,788 | Sperry | Aug. 12, 1930 |
| 2,177,242 | Carlson | Oct. 24, 1939 |
| 1,998,938 | Mettag | Apr. 23, 1935 |

Disclaimer 2,416,097.—*Albert Hansen, Jr.*, Nahant, and *Richard G. Jewell*, Swampscott, Mass., and *Frithiof V. Johnson*, Scotia, and *Richard W. Porter*, Schenectady, N. Y. AUTOMATIC PILOT. Patent dated Feb. 18, 1947. Disclaimer filed July 31, 1957, by the assignee, *General Electric Company*.

Hereby enters this disclaimer to claims 2, 3, 4, 5, 8, 9, 10, 12, and 13 of said patent.

[*Official Gazette August 27, 1957.*]